G. B. CHASE.
DEVICE FOR CUTTING AND SEEDING PEACHES AND OTHER SIMILAR FRUITS.
APPLICATION FILED MAR. 13, 1917.
1,263,742.
Patented Apr. 23, 1918.
2 SHEETS—SHEET 2.
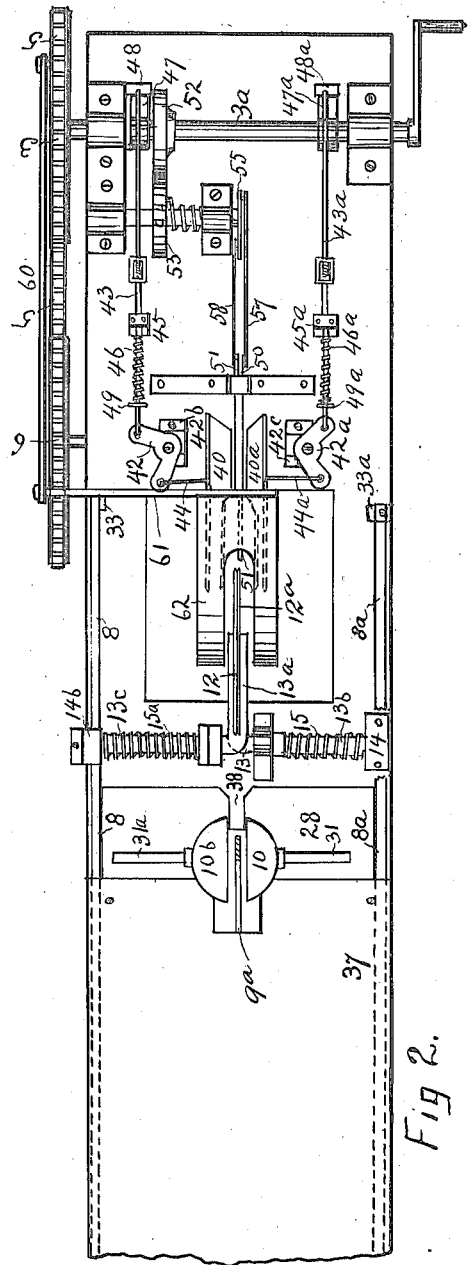
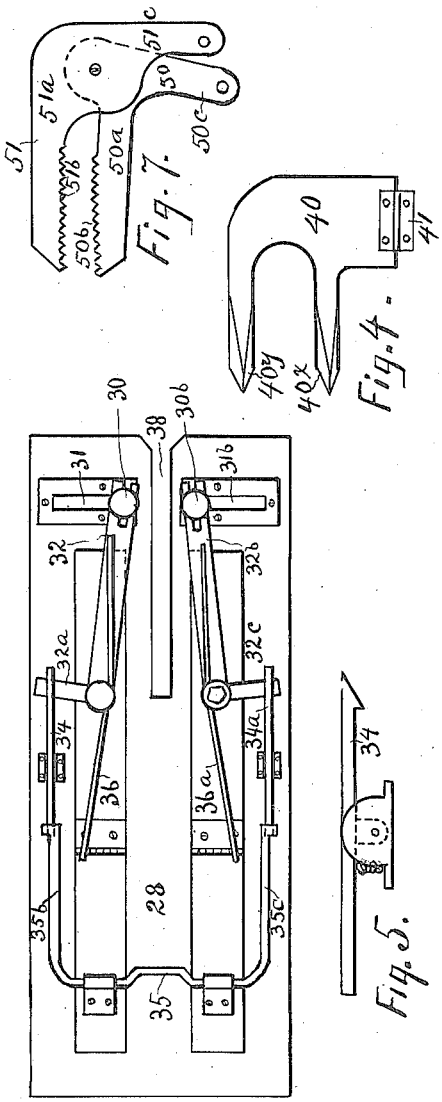
WITNESSES:
INVENTOR
George B Chase
BY
Francis C Huebner,
ATTORNEY

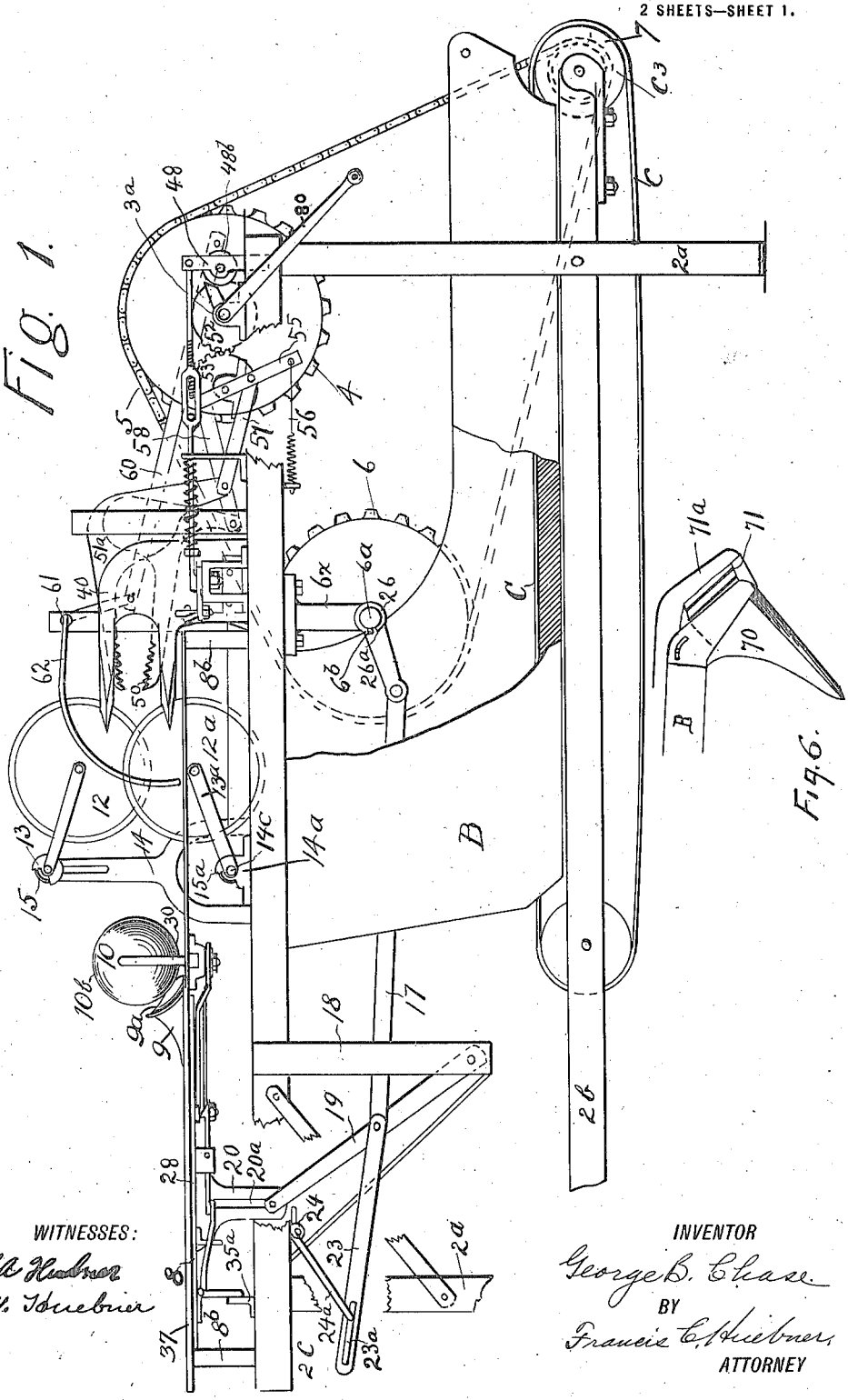

UNITED STATES PATENT OFFICE.

GEORGE B. CHASE, OF FRESNO, CALIFORNIA, ASSIGNOR OF ONE-THIRD TO WILLIAM E. BRODIE AND ONE-THIRD TO JAMES A. REEDY, BOTH OF FRESNO, CALIFORNIA.

DEVICE FOR CUTTING AND SEEDING PEACHES AND OTHER SIMILAR FRUITS.

1,263,742.  Specification of Letters Patent.  Patented Apr. 23, 1918.

Application filed March 13, 1917. Serial No. 154,624.

*To all whom it may concern:*

Be it known that I, GEORGE B. CHASE, a citizen of the United States, and a resident of the city of Fresno, county of Fresno, and State of California, have invented a new and useful Device for Cutting and Seeding Peaches and other Similar Fruits, of which the following is a specification.

My invention relates to a device for cutting peaches, apricots, nectarines, and other similar fruits having seeds therein of the free stone variety, into halves, along the line of the seam in such fruit, and in extracting the seeds therefrom. In the drawings which accompany this specification, and which are hereby made a part hereof, Figure 1 represents a side elevation of the device with parts thereof cut away to expose the workings of the device. Fig. 2 shows a top plan of the invention. Fig. 3 is a view of the under side of the sliding plate, and showing the portions of the machine attached thereto. Fig. 3 shows the jaws for grasping the seeds of the fruit. Fig. 4 is a view of one of a pair of spreaders for separating the fruit from the seed therein. Fig. 5 is a side view of a catch for holding the portions of the uncut-fruit holder apart. Fig. 6 is a screen for separating cut-fruit from the seeds which have theretofore been extracted therefrom. Fig. 7 is a view of the jaws of the seed holder in operative relation.

In the said drawing the main frame of the device is shown by the standards $2^a$, the beams $2^b$ which are attached horizontally to said standards, and the table $2^c$, which rests upon the top of standards $2^a$. B is a receptacle into which the fruit falls after it is cut into halves and the seed is extracted therefrom. C is an endless belt forming a part of the bottom of receptacle B, which belt when in motion carries the cut fruit and seeds to a depository, or to a screen separator hereinafter explained and referred to.

$3^a$ is the main shaft to which the power is applied to the different portions of the machine, hereinafter described. 4 is a toothed sprocket carried on shaft $3^a$. 5 is a chain driven by said sprocket 4, and carries power to, and drives toothed sprockets 6 and 7 hereinafter described. Instead of the sprockets shown in the drawing, a train of cog wheels can be substituted, or other means of transmitting power in a positive manner.

In my invention there are four separate steps required to accomplish the result desired, as follows: First, to carry the uncut fruit to the knives in such position that the incision will be on line with the seam of the fruit. Second, the cutting of the fruit into halves. Third, the extracting of the seeds therefrom. Fourth, carrying the cut fruit to a depository, and the seeds to some other receptacle. These several steps will be described in the order mentioned.

In said drawing $8^b$ are four standards on the top of table $2^c$, and near the outside edge thereof. 8 and $8^a$ are slideways, one of which runs along each side of table $2^c$, and rests upon standards $8^b$. These slideways are formed with the slots on the inside. 28 is a plate, or slide which slidingly fits into slideways 8 and $8^a$. 20 is a depending bracket attached to sliding plate 28, having a perpendicular slot $20^a$ therein. $6^a$ is a shaft attached to sprocket wheel 6. $6^x$ is a support depending from table $2^c$, into the lower end of which shaft $6^a$ is journaled. $6^b$ is a lug projecting beyond the periphery of shaft $6^a$. 26 is a sliding crank fitted on shaft $6^a$. $26^a$ is a shoulder, or detent in the hub of crank 26. The relation of the lugs $6^b$, and the detent $26^a$ is such that as shaft $6^a$ rotates lug $6^b$ will engage with detent $26^a$. 17 is a connecting rod pivoted at one end to crank 26, and at the other end to lever 19, at a point on said lever between its ends. 18 is a support depending from table $2^c$ backward from support $6^x$. Lever 19 is pivoted at one end to the lower end or support 18, and the other end is slidingly pivoted through slot $20^a$. 24 is a coiled torsion spring attached to the under side of table $2^c$, back of depending support 18, said spring having a depending arm $24^a$. 23 is a lever pivoted to arm 17, and slidingly pivoted through slot $23^a$ to arm $24^a$. When sprocket 6 is rotated, lug $6^b$ engages detent $26^a$, which forces the crank 26 to rotate with shaft $6^a$. This movement of the crank is transmitted through connecting rod 17, and lever 19 to the sliding plate 28. Lug $6^b$ is timed on the shaft so that said sliding plate 28 is moved forward and toward the rotary knives 12 and $12^a$. In the movement of lever 23 while the sliding plate 28 is going forward, the tension of spring 24 is tightened and the relation of lug $6^b$, detent 26 and spring 24 is such that when crank 26 is forced over the eccentric, spring 24 carries crank 26 and sliding plate 28 backward more rapidly than would be the case if crank 26 were rigidly attached to shaft 6ª.

10 and 10ᵇ are cups attached to upright posts 30 and 30ᵇ in such relation that the openings in the cups approach each other. 31 and 31ª are slots running transversely across sliding plate 28, and near the forward end thereof. Posts 30 and 30ᵇ are slidingly pivoted in said slots 31 and 31ª, and extend upward. 32 and 32ᵇ are levers having right angle extensions 32ª and 32ᶜ which are pivoted on the under side of sliding plate 28. The levers 32 and 32ᵇ are pivoted in such relation that an end of the lever 32 extends to slot 31, and the end of extension 32ª reaches to the outside edge of sliding plate 28, and one end of lever 32ᵇ extends to the slot 31ᵇ, and the end of the extension 32ᶜ reaches to the side of sliding plate 28 opposite to the edge approached by extension 32ª. At the forward end of slideways 8 and 8ª are stops 33 and 33ª, arranged in such relation with the extensions 32ª and 32ᶜ that when sliding plate 28 is near the forward end of its travel, said arms are engaged by the stops and are moved backward in relation to the sliding plate, and cups 10 and 10ᵇ are automatically opened or separated. 34 and 34ª are catches pivoted on the under side of plate 28 in such relation to extensions 33ª and 33ᶜ that when the cups are parted, catches 34 and 34ª engage arms 32 and 32ᵇ and hold the cups 10 and 10ᵇ in such open relation until catches 34 and 34ª are released. This is accomplished by means of a trip 35. Said trip is in the shape of a U having the lower portion thereof bent at an angle to the arms designated 35ᵇ and 35ᶜ. Said trip is pivoted on the underside of sliding plate 28 so that the ends of arms 35ᵇ and 35ᶜ can have a slight vertical movement, and so that the lower bent portion depends downward. When the ends of arms 35ᵇ and 35ᶜ are moved upward, they release catches 34 and 34ª. 35ª is a stop attached to table 2ᶜ in such relation to the other parts of mechanism that it comes in contact with the lower bent portion of trip 35 just before the sliding plate 28 has reached its farthest point in its backward travel, and transmits a motion to arms 35ᵇ and 35ᶜ as above described. 36 and 36ª are bow springs arranged on levers 32 and 32ᵇ to normally hold cups 10 and 10ᵇ in close proximity to each other. 38 is a slot, or opening in sliding plate 28 for the purpose of permitting said plate to slide partially past the circular knives 12 and 12ª. 37 is a platform on the top of slideways 8 and 8ª. 9 is a bracket attached to platform 37, and 9ª is a blade attached to said bracket. Blade 9ª is located on said platform in such relation to cups 10 and 10ᵇ that when sliding plate 28 is moved back to the farthest point in its travel, which should be on line with the peach deposited on blade 9ª, it will be between cups 10 and 10ᵇ, and on a parallel plane with the plane of the periphery of said cups. The object of this construction is to permit the operator to place the peach on the blade 9ª so the seam of the fruit is in line with the plane of circular knives 12 and 12ª, and when the peach is grasped between the cups 10 and 10ᵇ, the peach will be carried forward toward the circular knives and cut by them on the same plane, to-wit, around the greatest diameter of the seed. 12 and 12ª as heretofore referred to are circular knives rotatingly suspended on arms 13 and 13ª so the said blades are on the same parallel plane with the blade 9ª. 13ª and 13ᵇ are portions of arms 13 and 13ª bent at right angles, and are carried in journals 14 and 14ᵇ. The journal 14ª is held in an upright support 14ᶜ, attached to one side of table top 2ᶜ, and 14 is a taller upright support carrying journal 14ᵇ. 15 and 15ª are spiral springs which normally hold circular knives 12 and 12ª in such position that they slightly overlap, but these springs permit the knives to be slightly separated under pressure so they will permit the knives to roll over the seeds in the fruit.

40 and 40ª are spreaders, each of which consists of a U shaped plate having an extension on one side thereof. These spreaders are hinged to table top 2ᶜ in such relation to circular knives 12 and 12ª that when they are standing upright they are on parallel planes with said circular knives, and they fit snugly against the sides of said circular knives. The said hinges permit the spreaders to open away from the circular knives. The points of the spreaders, 40ˣ and 40ʸ are beveled on the outside, and are placed in such relation with the circular knives that they always overlap them. The opening between the arms of said spreaders is on line with travel of the approximate center of cups 10 and 10ᵇ, the object being for the seeds of the fruit to pass between them. 42 and 42ª are bell cranks pivoted on supports 42ᵇ and 42ᶜ, which are attached to table 2ᶜ. 44 and 44ª are rods pivoted to one of the arms of each of said bell-cranks, and the other end of which is attached to one of the spreaders 40 and 40ª, at a point above the hinges 41 and 41ª. 48 and 48ª are upright levers, the lower end being pivoted to table 2ᶜ. 43 and 43ª are rods shown in the drawing as being adjustable as to length, which extend from arms of the bell-crank levers 42 and 42ª. 45 and 45ª are guides attached to table 2ᶜ through which rods 43 and 43ª pass. 49 and 49ª are collars attached to rods 43 and 43ª. 46 and 46ª are compression springs encircling portions of rods 43 and 43ª between guide 45 and collar 49, and between guide 45ᵃ and collar 49ᵃ. These springs normally hold the bell cranks 42 and 42ᵃ in such position that the spreaders 40 and 40ᵃ are upright. 48ᵇ and 48ᶜ are rollers attached to levers 48 and 48ᵃ for the purpose of reducing friction in the operation of said levers 48 and 48ᵃ. 47 and 47ᵃ are eccentrics, or dogs attached to drive shaft 3ᵃ in such relation with the mechanism to which it transmits motion, that when the shaft 3ᵃ revolves, they engage with rollers 48ᵇ and 48ᶜ, thereby transmitting a longitudinal motion intermittently to the bell-cranks 42 and 42ᵃ, which in turn intermittently pull the spreaders apart. The eccentrics, or dogs 47 and 47ᵃ are timed with the sliding plate 28 so that the spreaders are pulled apart immediately after the cups 10 and 10ᵇ are started on their backward travel. The object of this construction is to have the spreaders enter the peach along the line cut by the circular knives 12 and 12ᵃ, and then by separating, force the halves of the fruit apart, and from the seed.

50 and 51 are jaws for holding the seeds while the two halves of the peach are being forced apart. 50 is the lower jaw, and consists of a blade 50ᵃ having a series of teeth 50ᵇ on the upper side thereof, and having an extension at one end of the blade making it in the approximate form of a T. 51 represents the upper jaw, having a blade 51ᵃ with teeth 51ᵇ on the under side thereof, and having a depending portion 51ᶜ, which gives it approximately the form of an L. Jaws 50 and 51 are pivoted together so the jaws can approach, or recede from each other like the jaws of a pair of pincers, by moving the extensions 50ᶜ and 51ᶜ from each other or toward each other.

52 is an intermittent-cog wheel attached to main shaft 3ᵃ, 53 is a slip-cog wheel which is journaled in a bracket 53ᵃ which is attached to table 2ᶜ. Intermittent-cog wheel 52 and slip-cog wheel 53 are arranged in such relation that their cogs engage. 55 is a double crank attached to slip-cog 53. 57 is a connecting rod from one arm of crank 55 to the extension 50ᶜ on the lower jaw 50. 58 is a connecting rod extending from the other arm of said crank 55 to the extension 51ᶜ on upper jaw 51. 56 is a tension spring which normally holds the double crank 55 in such position that blades 50ᵃ and 51ᵃ are held apart, and the slip-cog wheel 53 is in such position that the cogs thereon are ready for engagement with the cogs on intermittent-cog wheel 52. It will be noted that when the wheel 52 is rotated and the cogs thereon engage with the cogs on wheel 53, wheel 53 is turned partially around, placing the jaws 50 and 51 in a closed relation. When the cogs on wheel 52 pass the cogs on wheel 53, wheel 53 is pulled back by spring 56, and the jaws 50 and 51 are thereby opened. The position of the cogs on intermittent cog wheel 52 on the shaft 3ᵃ is timed so the jaws 50 and 51 close just before the spreaders 40 and 40ᵃ separate the halves of the peaches from each other and from the seed. It will be observed that when the machine is operated a peach can be placed on the blade 9ᵃ, the cups 10 and 10ᵃ move to a position directly opposite the peach. The cups are then released by a trip, and the cups snap together and clamp the fruit between them after which the cups move forward carrying the fruit to knives 12 and 12ᵃ, which cuts them in halves, after which the spreaders separate the halves from each other and from the seed which is being held between the toothed jaws. The cut fruit and the seed, separately, are dropped into a receptacle on an endless belt carrier, which carries it to a screen 60, which screen permits the seeds to pass through, and which carries the cut fruit to a separate receptacle.

Having described my invention, I claim as new, and ask for Letters Patent upon:

1. In a device for cutting into halves, and extracting the seeds from peaches and other similar fruits, the combination of two rotary knives arranged to cut approximately on the same plane, spring means for normally holding such knives so the cutting edges thereof slightly overlap, and for permitting the said cutting edges to be separated under pressure, means for carrying the fruit toward and through such knives consisting of a sliding plate and means for moving said sliding plate toward and from said knives, two cups slidingly attached to said sliding plate in such relation that the openings in the cups are toward each other, spring means for normally holding said cups in close proximity, and means for forcing said cups apart after the fruit held therein is cut in two, and during the backward travel of the said sliding plate, and means for forcing the portions of the meat of the fruit from the seeds, substantially as described and for the purposes set forth.

2. In a device of the character described the combination of rotary knives adapted to cut approximately on the same plane, and means for carrying the fruit toward such knives consisting of slideways on line with the plane of the knives, a sliding plate operable in the slideways, cups attached to the sliding plate with the open ends of the cups approaching each other, and in such relation to the knives that in their line of travel one of the cups will pass on each side of the knives, means for holding the cups in close proximity during their travel toward and beyond the knives, and for holding them apart during their backward travel and means for extracting the seeds from the fruit substantially as described.

3. In a device of the character described, the combination of rotary knives arranged to cut on an approximately parallel plane, a fruit feeder consisting of a blade placed on a plane approximately parallel with the rotary knives, slideways forming a line of travel between the fruit feeder and the rotary knives, a sliding plate operable in the slideway, two cups attached to the slideway in such relation with the knives and the fruit feeder that in their line of travel the opening of the cups approach each other and the knives and the fruit feeder will pass between them, and spring means for holding the cups close together in the line of travel from the fruit feeder to the knives and for holding them apart in the line of travel from the knives to the fruit feeder.

4. In a device of the character described the combination of rotary knives arranged to cut on approximately the same plane, a fruit feeder, slideways forming a line of travel on line with the cutting edges of the rotary knives from the fruit feeder to and beyond the rotary knives, a sliding plate operable in the slideway, a fruit holder attached to the sliding plate, and means for giving the sliding plate an intermittent forward and back motion.

5. In a device of the character described for cutting and seeding peaches and fruits of the free stone variety, the combination of rotary knives arranged to cut on approximately the same plane, a fruit holder arranged to travel forward and back in line with the cutting edges of the knives, and to carry the fruit through the rotary knives, means for clamping the seed immediately after the fruit is cut, and means for forcing the cut portions of the fruit from the seed, substantially as described.

6. In a device of the character described, the combination of rotary knives arranged to cut on approximately the same plane, a slideway parallel to the line of the cutting edges of the rotary knives, a sliding plate operable in the slideway, means for giving the sliding plate a forward and back motion in the slideway, fruit holders attached to the sliding plate consisting of cups arranged with the openings facing each other and adapted to remain close together as the fruit holder approaches the knives and to spread apart on the trip back, and means for removing the fruit from the fruit holders on the back movement consisting of a member arranged to drop behind the fruit holder and on each side of the rotary knives when it has reached the farthest point in its forward travel, and to remain in such position intermittently and while the fruit holder travels backward so that said members will pass between the cups, and means for moving such members out of line of travel of the fruit holders on their forward travel, substantially as described.

7. In a device of the character described, the combination of rotary knives arranged with their cutting edges on approximately the same plane, a slideway on parallel lines to the cutting edge of the rotary knives, a fruit holder operable in the slideway, consisting of two cups arranged with their openings toward each other and so that one cup will pass on each side of the rotary knives, and adapted to lie close together when the fruit holder is approaching the knives and to be farther apart on the backward movement, and means for grasping and clamping the seed of the fruit consisting of pincer jaws having teeth on the inside thereof, and arranged in line with the cutting edges of the rotary knives, and adapted to close when the center of fruit carrier is between the jaws and to open when the center of the fruit carrier has passed from between the jaws.

8. In a device of the character described, the combination of rotary knives arranged with their cutting edges on approximately the same plane, a slideway on parallel lines to the cutting edge of the rotary knives, a fruit holder operable in the slideway, consisting of two cups arranged with their openings toward each other and so that one cup will pass on each side of the rotary knives, and adapted to lie close together when the fruit holder is approaching the knives and to be farther apart on the backward movement, and means for grasping and clamping the seed of the fruit consisting of pincer jaws having teeth on the inside thereof, and arranged in line with the cutting edges of the rotary knives, and adapted to close when the center of fruit carrier is between the jaws and to open when the center of the fruit carrier has passed from between the jaws, and means for separating the fruit from the seeds consisting of two U-shaped plates arranged on parallel planes with the rotary knives one on each side of the pincer jaws, and so the center of the cups will pass within the U and adapted to be pressed closely to each side of the pincer jaws, and means for pressing the U-shaped plates closely together and apart, timed so they will press closely to the pincer jaws when they are being closed, and will press apart before the pincer jaws open, substantially as described.

GEORGE B. CHASE.

Witnesses:
JULIUS HANSEN,
S. W. DICKINSON.